(12) United States Patent
Ashikawa et al.

(10) Patent No.: US 10,102,859 B2
(45) Date of Patent: Oct. 16, 2018

(54) CONFERENCE SUPPORT APPARATUS, CONFERENCE SUPPORT METHOD, AND COMPUTER PROGRAM PRODUCT

(71) Applicant: Kabushiki Kaisha Toshiba, Minato-ku, Tokyo (JP)

(72) Inventors: Taira Ashikawa, Kawasaki Kanagawa (JP); Kosei Fume, Kawasaki Kanagawa (JP); Masayuki Ashikawa, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/387,335

(22) Filed: Dec. 21, 2016

(65) Prior Publication Data
US 2017/0263265 A1    Sep. 14, 2017

(30) Foreign Application Priority Data
Mar. 11, 2016    (JP) ................................ 2016-048489

(51) Int. Cl.
*G10L 15/26* (2006.01)
*G06F 3/0481* (2013.01)
(Continued)

(52) U.S. Cl.
CPC ............ *G10L 15/26* (2013.01); *G06F 3/0482* (2013.01); *G06F 3/04817* (2013.01);
(Continued)

(58) Field of Classification Search
CPC ...................................................... G10L 15/26
See application file for complete search history.

(56) References Cited

U.S. PATENT DOCUMENTS 7,729,917 B2 * 6/2010 Miyamoto .............. G10L 15/22
704/270
2009/0306981 A1 * 12/2009 Cromack .......... G06F 17/30743
704/235
(Continued)

FOREIGN PATENT DOCUMENTS

JP    2007-256714    10/2007
JP    2009-187349    8/2009
(Continued)

*Primary Examiner* — Douglas Godbold
(74) *Attorney, Agent, or Firm* — Knobbe, Martens, Olson & Bear, LLP

(57) ABSTRACT

According to an embodiment, a conference support apparatus includes a recognizer, a detector, a summarizer, and a subtitle generator. The recognizer is configured to recognize speech in speech data and generate text data. The detector is configured to detect a correction operation on the text data, the correction operation being an operation of correcting character data that has been incorrectly converted. The summarizer is configured to generate a summary relating to the text data subsequent to a part to which the correction operation is being performed, among the text data, when the correction operation is being detected. The subtitle generator is configured to generate subtitle information corresponding to the summary when the correction operation is being detected, and configured to generate subtitle information corresponding to the text data except when the correction operation is being detected.

10 Claims, 13 Drawing Sheets

(51) Int. Cl.
*G06F 3/0482* (2013.01)
*G06F 17/21* (2006.01)
*G10L 15/08* (2006.01)
*G10L 21/10* (2013.01)
*G06F 17/30* (2006.01)
*G06F 17/24* (2006.01)
*G10L 21/06* (2013.01)
*G06F 17/27* (2006.01)

(52) U.S. Cl.
CPC ...... *G06F 17/214* (2013.01); *G06F 17/30719* (2013.01); *G10L 15/08* (2013.01); *G10L 21/10* (2013.01); *G06F 17/24* (2013.01); *G06F 17/273* (2013.01); *G10L 2015/088* (2013.01); *G10L 2021/065* (2013.01)

(56) References Cited

U.S. PATENT DOCUMENTS

2014/0163981 A1* 6/2014 Cook .................. G10L 15/26
704/235
2017/0169822 A1* 6/2017 Fujita .................. G10L 15/16
2017/0277784 A1* 9/2017 Hay .................. G06F 17/30778

FOREIGN PATENT DOCUMENTS

| JP | 2010-282083 | 12/2010 |
|----|-------------|---------|
| JP | 2011-102862 | 5/2011  |

* cited by examiner

```
<div id="1" class="subtitle">
 <span class="speaker">Mr. A</span>
 <span class="content">We will begin today's conference</span>
</div>
```

CONFERENCE SUPPORT APPARATUS, CONFERENCE SUPPORT METHOD, AND COMPUTER PROGRAM PRODUCT

CROSS-REFERENCE TO RELATED APPLICATION

This application is based upon and claims the benefit of priority from Japanese Patent Application No. 2016-048489, filed on Mar. 11, 2016; the entire contents of which are incorporated herein by reference.

FIELD

Embodiments described herein relate generally to a conference support apparatus, a conference support method, and a computer program product.

BACKGROUND

Today, a conference support apparatus that converts speech of conference participants into text data in real time and displaying the text data using a speech recognition technology has been known. The conference support apparatus supports a person with hearing impairments who are participating a conference to understand the content of the conference through words.

In the conference support apparatus, when a number of speakers speak simultaneously, or when a speech recognition process is carried out under the environment where surrounding noise is large, the accuracy of the speech recognition is reduced. Thus, the speech of the conference participant may be converted into incorrect character data. In this case, a corrector or the like manually corrects the character data (recognition result) that has been incorrectly converted.

However, when the discussion in the conference progresses while the corrector is performing a correction operation and a viewer is performing a confirmation operation on the corrected content, the recognition results of the speech corresponding to the discussion that is in progress will be displayed. Thus, it is difficult for the corrector and the viewer to concentrate on the operations. In addition, it is difficult for the corrector and the viewer to understand the content of the discussion, while the corrector and the viewer are performing the operations described above, respectively. To understand the content of the discussion that is currently being held after the operations have finished, the corrector and the viewer need to read the content of the discussion from when each of the operations has started to when the operation has finished. Thus, it takes time to understand the content of the discussion that is currently being held, after the operation has finished.

DETAILED DESCRIPTION

According to an embodiment, a conference support apparatus includes a recognizer, a detector, a summarizer, and a subtitle generator. The recognizer is configured to recognize speech in speech data and generate text data. The detector is configured to detect a correction operation on the text data, the correction operation being an operation of correcting character data that has been incorrectly converted. The summarizer is configured to generate a summary relating to the text data subsequent to a part to which the correction operation is being performed, among the text data, when the correction operation is being detected. The subtitle generator is configured to generate subtitle information corresponding to the summary when the correction operation is being detected, and configured to generate subtitle information corresponding to the text data except when the correction operation is being detected.

Hereinafter, embodiments of a conference support system will be described in detail with reference to the accompanying drawings.

First Embodiment

Conference Participants

Figure 1:
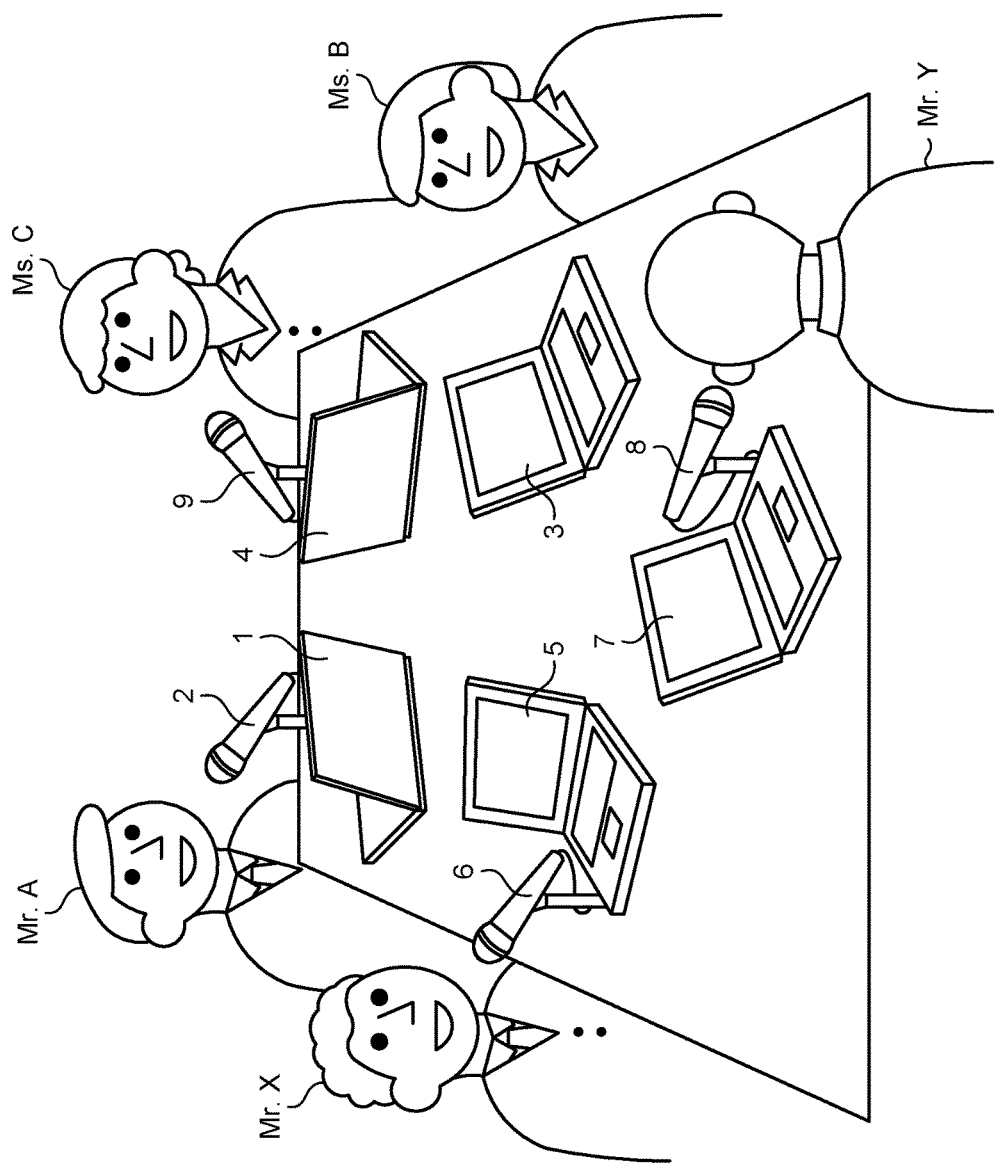
FIG. 1 is a diagram illustrating a state when a conference is being held in a conference support system of a first embodiment.

FIG. 1 illustrates a state when a conference is being held with five conference participants, in a conference support system of a first embodiment. In an example illustrated in FIG. 1, the conference participants are Mr. A, Ms. B, Ms. C, Mr. X, and Mr. Y. Among the five participants, it is assumed that Mr. A, Ms. B, and Ms. C are logged into the conference support system, and Mr. X and Mr. Y are not logged into the conference support system.

Mr. A is a facilitator who leads and manages the conference. Mr. A uses the conference support system via a shared machine 1 that is provided in a conference room. A microphone device 2 is connected to the shared machine 1. Mr. A has a role of recording the speech in the shared machine 1 during the conference by setting the recording at the start of the conference. In addition, text data of the names of conference participants and text data on the agenda (topics to be discussed in the conference) are stored in advance in a storage (reference numeral 14 in FIG. 2 or the like) such as a hard disk drive (HDD) in the shared machine 1, as conference information. The storage such as the HDD of the shared machine 1 stores therein the proceedings of text data (including text data an unclear point of which indicated by Ms. B with hearing impairments has been corrected) of the speech of the conference participants during the conference. Similar to Ms. C, who will be described below, Mr. A can confirm the unclear point indicated by Ms. B with hearing impairments, and perform a correction operation.

Ms. B has hearing impairments (who requires information support). Ms. B uses the conference support system by using a personal computer device 3 of her own. The conference support system of the first embodiment displays speech recognition results (subtitles) of the speech of the conference participants in real time, on a display of each of the personal computer devices of the participants. By reading the subtitles being displayed on the display of the personal computer device 3, Ms. B participates the conference while understanding the content of the conference. In addition, should there be any unclear point on the recognition results (subtitles) of the speech being displayed, Ms. B indicates the unclear point.

Ms. C uses the conference support system, using a personal computer device 4 of her own. Ms. C participates the discussion while supporting Ms. B. Ms. C confirms the unclear point that is indicated by Ms. B, and performs a correction operation.

Mr. X and Mr. Y are the conference participants who participate the discussion using personal computer devices 5 and 7, and microphone devices 6 and 8 of their own. However, Mr. X and Mr. Y are the conference participants who have not logged into the conference support system as described above. However, even if Mr. X and Mr. Y have not logged into the conference support system, the subtitles corresponding to the speech recognition results of the speech are generated, and are displayed on the shared machine 1 and the personal computer devices 3, 4, 5, and 7 of the conference participants. The conference participants who have not logged into the conference support system (in this case, Mr. X and Mr. Y) may not participate the conference (Mr. X and Mr. Y need not attend the conference).

The shared machine 1 of Mr. A and the personal computer devices 3, 4, 5, and 7 of Ms. B, Ms. C, Mr. X, and Mr. Y who are the conference participants, for example, are connected with each other via a network such as a wireless local area network (LAN), a wired LAN, or the Internet.

Figure 2:
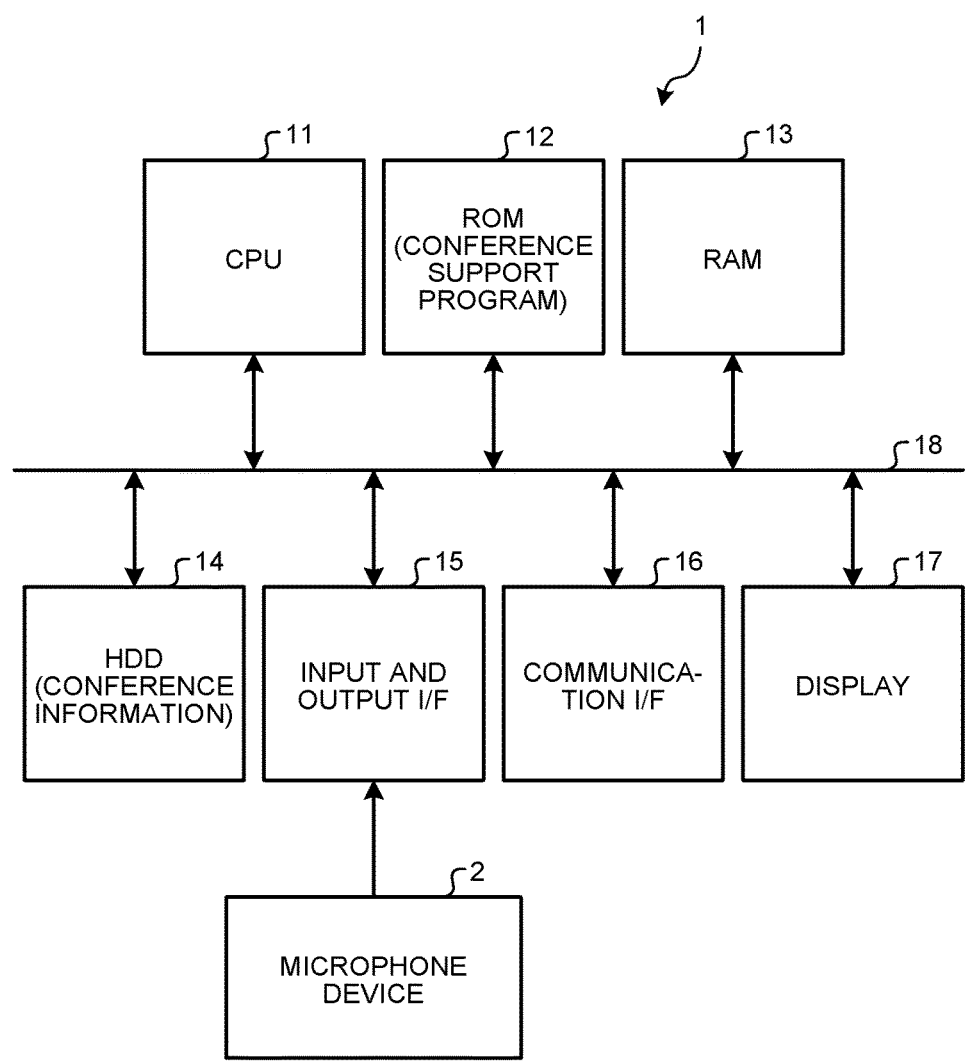
FIG. 2 is a hardware configuration diagram of a shared machine and a personal computer device provided in the conference support system of the first embodiment.

FIG. 2 is a hardware configuration diagram of the shared machine 1 that is operated by Mr. A and the personal computer devices 3, 4, 5, and 7 of the conference participants. The configuration will be described using the shared machine 1 operated by Mr. A. The shared machine 1 includes a CPU 11, a ROM 12, a RAM 13, an HDD 14, an input and output interface (input and output I/F) 15, a communication I/F 16, and a display 17.

The CPU is an abbreviation of "central processing unit". The ROM is an abbreviation of "read only memory". The RAM is an abbreviation of "random access memory. The HDD is an abbreviation of "hard disk drive". The CPU 11 to the display 17 are connected with each other via a bus line 18. Microphone devices used by the conference participants such as the microphone device 2, the microphone device 6, the microphone device 8, and a microphone device 9 are connected to the input and output I/F 15. Furthermore, the shared machine 1 and the personal computer devices 3, 4, 5, and 7 of Mr. A, Ms. B, Ms. C, Mr. X, and Mr. Y are connected with each other via the communication I/F 16 that is provided on each of the devices.

Figure 3:
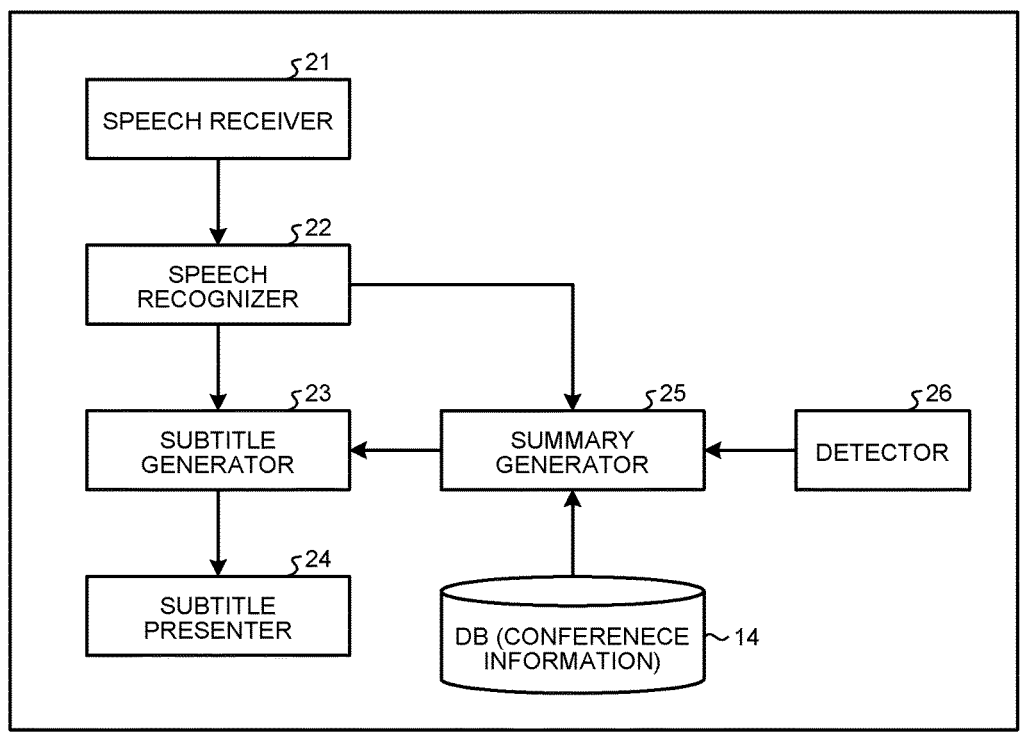
FIG. 3 is a functional block diagram corresponding to a conference support program provided in the conference support system of the first embodiment.

A conference support program is stored in the ROM 12 of the shared machine 1 and each of the personal computer devices 3, 4, 5, and 7. FIG. 3 is a functional block diagram of functions that are implemented when the CPU 11 executes the conference support program. As illustrated in FIG. 3, the CPU 11 functions as a speech receiver 21, a speech recognizer 22, a subtitle generator 23, a subtitle presenter 24, a summary generator 25, and a detector 26, based on the conference support program.

The speech receiver 21 receives speech through the microphone device 2. The speech recognizer 22 is an example of a recognizer, and generates text data that is the speech recognition result of the received speech. The subtitle generator 23 generates subtitle information in a Hyper Text Markup Language (HTML) format, which will be described below, using the text data of the recognized speech. The subtitle presenter 24 displays the generated subtitle information on the display 17 of the personal computer device 1, and transmits the generated subtitle information to the personal computer devices 3, 4, 5, and 7 of the conference participants via the network for display.

For example, when Ms. B with hearing impairments cannot understand the meaning of the subtitle, Ms. B operates the personal computer device 3 of her own, and indicates an incorrect subtitle. Consequently, indication information indicating that the subtitle is incorrect is transmitted from the personal computer device 3 of Ms. B to the shared machine 1 of Mr. A. The detector 26 detects the presence of the indication information indicating that the meaning of the subtitle information is difficult to understand.

Based on a detection output from the detector 26, the subtitle generator 23 generates a mark indicating an unclear part of the subtitle that is indicated by Ms. B with hearing impairments. The subtitle presenter 24 displays the generated mark adjacent to the display position of the subtitle that is indicated by Ms. B. The generated mark may also be overlapped with the display position of the subtitle that is indicated by Ms. B, or may be displayed at the vicinity of the subtitle that is indicated by Ms. B.

Ms. C performs a correction process on the sentence of the unclear part of the subtitle that is indicated by Ms. B, via the personal computer device 4 of her own. The detector 26 detects that Ms. C has started to perform the correction operation on the unclear part of the subtitle. The summary generator 25 is an example of a summarizer. While the subtitle is being corrected, the summary generator 25 generates text data in which the text data of the speech subsequent to the subtitle that is being corrected is summarized into 5 to 15 words, for example. During the correction operation, the subtitle generator 23 generates corrected subtitle information, using the generated summarized text data. The subtitle presenter 24 changes the subtitle that is indicated by Ms. B to the corrected subtitle for display. The subtitle generator 23 and the subtitle presenter 24 are examples of a subtitle generator.

The speech receiver 21 to the detector 26 may implement a part or all of the functions by using hardware such as an integrated circuit (IC). The conference support program may be recorded on a computer-readable recording medium, which may be provided as a computer program product, such as a compact disc-read only memory (CD-ROM) and a flexible disk (FD) in an installable or executable file format. In addition, the conference support program may be recorded on a computer readable recording medium, which may be provided as a computer program product, such as a compact disc-recordable (CD-R), a digital versatile disc (DVD), a Blu-ray disc (registered trademark), and a semiconductor memory. Furthermore, the conference support program may be installed via a network such as the Internet. The conference support program may also be incorporated in advance in the ROM of the device or the like.

Next, an operation of the conference support system of the first embodiment having the above configuration will be described.

Before Starting a Conference

First, a user (conference participant) who uses the conference support system of the first embodiment logs into the present system, when a conference is to be held. In the example illustrated in FIG. 1, as described above, Mr. A, Ms. B, and Ms. C have logged into the conference support system, but Mr. X and Mr. Y participate the conference without logging into the conference support system. Even if Mr. X and Mr. Y are not logged into the conference support system, the speech of Mr. X and Mr. Y is converted into a text, and is stored in the HDD 14 of the shared machine 1 and each of the personal computer devices 3, 4, 5, and 7 of the conference participants as conference information.

Figure 4:
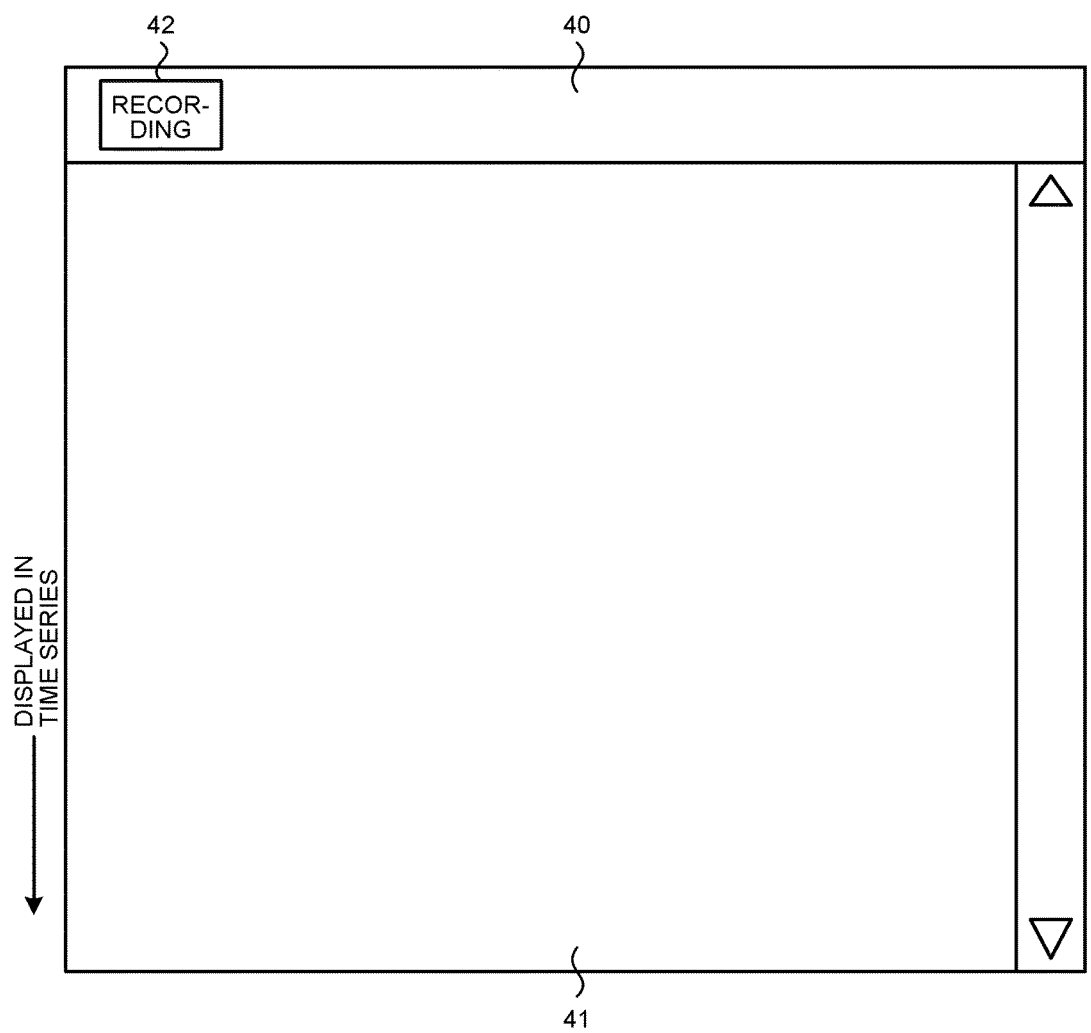
FIG. 4 is a diagram illustrating a conference screen of the conference support system of the first embodiment.

After the login, the CPU 11 of the shared machine 1 reads out conference information that is registered in the HDD 14, and displays a display screen illustrated in FIG. 4, on the display 17. In addition, the CPU 11 of each of the personal computer device 3, 4, 5, and 7 of the conference participants acquires the display screen from the shared machine 1, and displays the conference screen on the display 17, respectively. For example, the conference screen illustrated in FIG. 4 includes an operation unit 40 with which each of the conference participants specifies an operation such as recording, and a subtitle generator 41 on which the subtitles of the conference are to be displayed along a time axis.

When the conference is started, Mr. A who is the facilitator and has logged into the present system, operates a recording button 42 that is provided on the operation unit 40 on the conference screen. Upon detecting the operation of the recording button 42, the CPU 11 of the shared machine 1 detects the microphone device that is connected to the shared machine 1. In addition, upon detecting the operation of the recording button 42, the CPU 11 of the shared machine 1 communicates with the personal computer devices 3, 4, 5, and 7 of the conference participants, and detects the microphone devices that are connected to the personal computer devices 3, 4, 5, and 7 of the conference participants.

In the example of FIG. 1, the microphone device 2 is connected to the shared machine 1. Thus, the CPU 11 of the shared machine 1 detects the microphone device 2 that is connected to the shared machine 1. In addition, the microphone devices 9, 6, and 8 are connected to the personal computer devices 4, 5, and 7 of the conference participants, respectively. Thus, the CPU 11 of the shared machine 1 detects the microphone devices 9, 6, and 8 that are connected to the personal computer devices 4, 5, and 7 of the conference participants, respectively.

Figure 5:
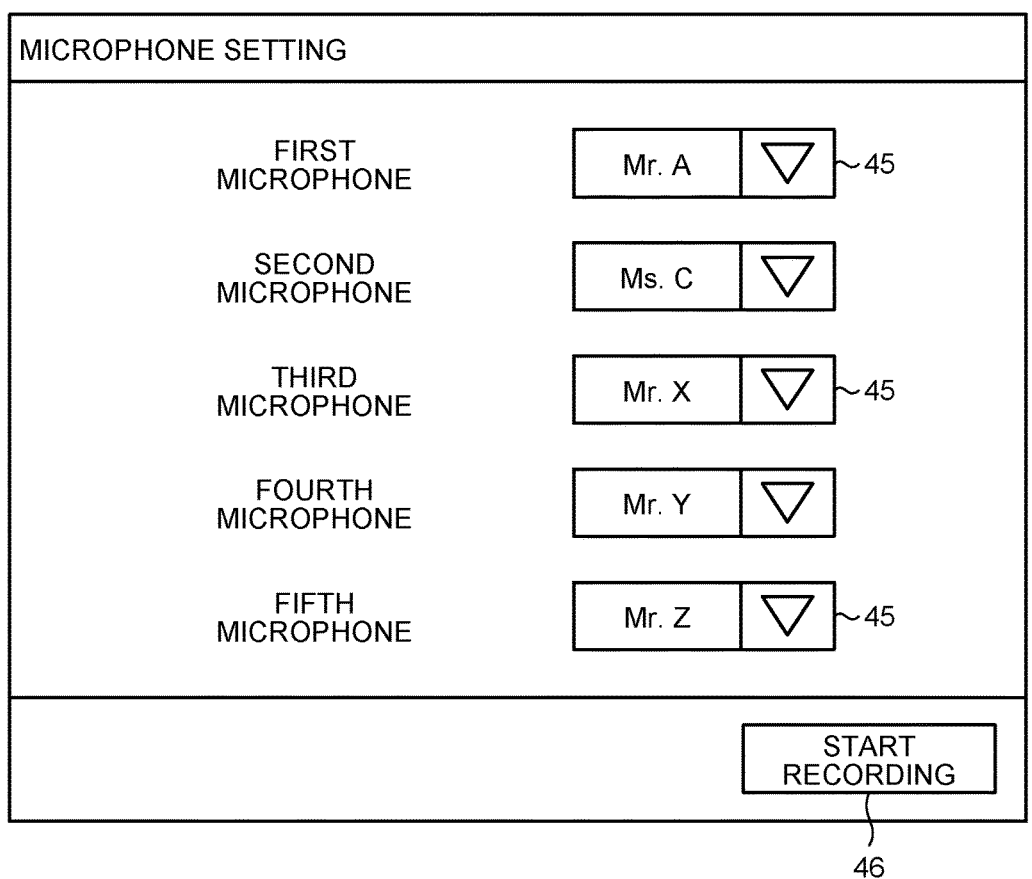
FIG. 5 is a diagram illustrating a microphone setting screen of the conference support system of the first embodiment.

Next, as illustrated in FIG. 5, the CPU 11 of the shared machine 1 displays a microphone setting screen for associating the conference participants with the microphone devices, respectively, on the display 17. In the microphone setting screen illustrated in FIG. 5, the conference participant corresponding to each of the microphone devices is selected and set from a pull down menu. In other words, when a pull down button 45 is operated, the CPU 11 displays a list of conference participant names that are registered in the HDD 14 in advance. Mr. A selects the conference participant corresponding to each of the microphone devices. The CPU 11 associates the information indicating the microphone device with the selected conference participant, and stores the associated information in the HDD 14 as conference information. Thus, the association setting between each of the microphone devices and the corresponding conference participant is completed.

In the example of FIG. 5, Mr. A who operates the shared machine 1 sets "himself (Mr. A)" as the conference participant who uses a first microphone device (microphone device 2), and sets "Ms. C" as the conference participant who uses a second microphone device (microphone device 9). In addition, in the example of FIG. 5, Mr. A who operates the shared machine 1 sets "Mr. X" as the conference participant who uses a third microphone device (microphone device 6), and sets "Mr. Y" as the conference participant who uses a fourth microphone device (microphone device 8). Furthermore, Mr. A who operates the shared machine 1 sets "Mr. Z" as the conference participant who uses a fifth microphone device, which is not illustrated.

When Mr. A who is the facilitator sets the conference participants corresponding to the microphone devices, respectively, in this manner, the conference participants can start speaking, and the conference is ready to start. Mr. A who is the facilitator operates a recording start button 46 illustrated in FIG. 5, when the content of the conference is to be recorded. The CPU 11 of the shared machine 1 of Mr. A displays the conference screen illustrated in FIG. 4, on the display of the shared machine 1. In addition, the CPU 11 of the shared machine 1 transmits the conference screen to the personal computer devices 3, 4, 5, and 7 of the conference participants. Consequently, the conference screen is displayed on the display of each of the personal computer devices 3, 4, 5, and 7 of the conference participants.

The CPU 11 of the shared machine 1 also updates the conference screen based on an input through the microphone from the personal computer devices 3, 4, 5, and 7 of the conference participants, an indication operation of an unclear part of the subtitle, a correction operation on the unclear part of the subtitle, and the like. The CPU 11 of the shared machine 1 not only displays the updated conference screen on the display, but also transmits the updated conference screen to the personal computer devices 3, 4, 5, and 7 of the conference participants. Thus, the updated conference screen is displayed on the display of each of the personal computer devices 3, 4, 5, and 7 of the conference participants.

Hereinafter, an operation of the shared machine 1 and an operation of each of the personal computer devices 3, 4, 5, and 7 of the conference participants will be explained with a specific example.

First Speech

First, during the conference, it is assumed that Mr. A says "We will begin today's conference" as a first speech. Based on the conference support program stored in the ROM 12, the CPU 11 of the shared machine 1 functions as the speech receiver 21 illustrated in FIG. 3, and acquires speech data corresponding to the first speech of Mr. A that is collected through the microphone device 2.

Next, the CPU 11 of the shared machine 1 functions as the speech recognizer 22, and performs a speech recognition process on the acquired speech data. For example, the CPU 11 obtains text data corresponding to the first speech of Mr. A of "We will begin today's conference", by the speech recognition process.

Figures 6, 7:
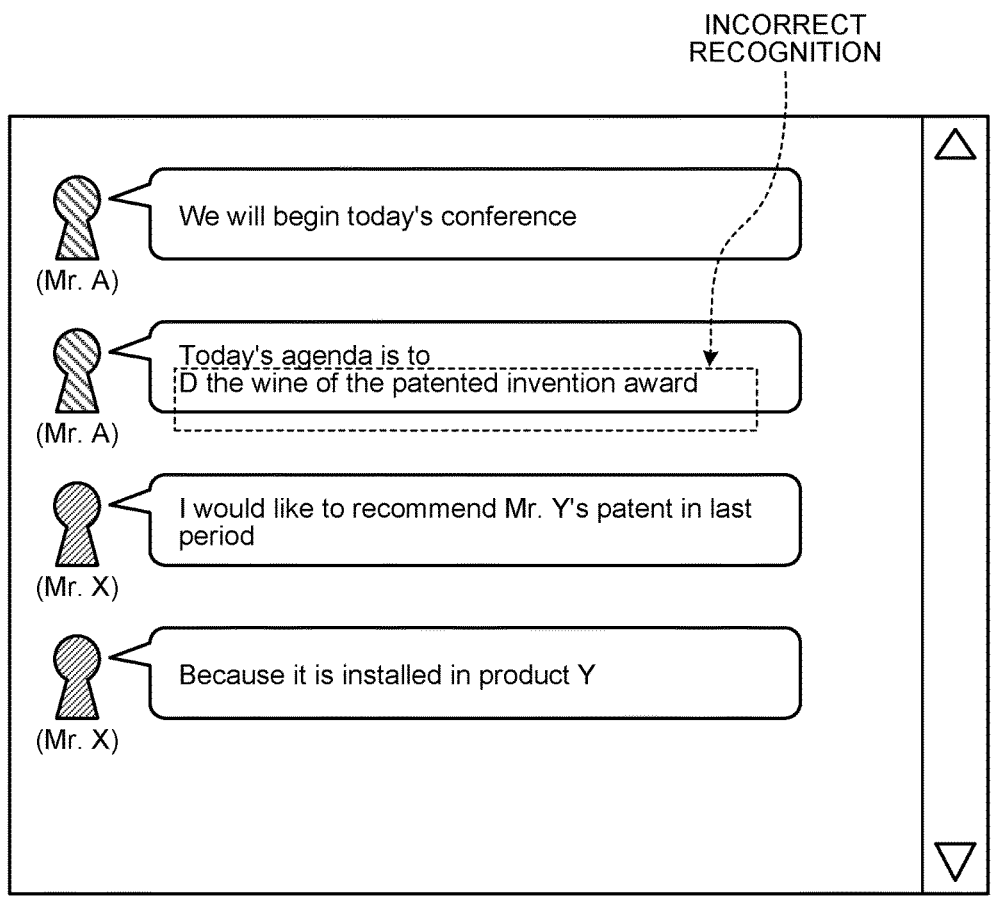
FIG. 6 is a diagram illustrating a description example of subtitle information in the conference support system of the first embodiment.
FIG. 7 is a diagram illustrating the subtitle information that is displayed on a subtitle portion of the conference screen, in the conference support system of the first embodiment.

Next, the CPU 11 of the shared machine 1 functions as the subtitle generator 23, and generates subtitle information in the HTML format, for example, from the information on the first speech of Mr. A and the speech recognition result (text data) of the first speech of Mr. A of "We will begin today's conference". As illustrated in FIG. 6, this subtitle information is generated as subtitle information with HTML tags. FIG. 6 illustrates an example in which the "speaker" of the first speech (<div id="1" class="subtitle">) is Mr. A, and the subtitle information ("content") of "We will begin today's conference" is generated by the subtitle generator 23. The subtitle generator 23 generates a single subtitle for each block of speech, i.e., each utterance unit that is speech detected by a voice activity detection (VAD) process and that is included in a single speech section. The utterance unit may include a sentence, sentences, a word, or words. The VAD process detects a speech section in the speech recognition result.

Next, the CPU 11 of the shared machine 1 functions as the subtitle presenter 24, and displays the generated subtitle information on the subtitle generator 41 (see FIG. 4) of the conference screen that is displayed on the display of the shared machine 1. The CPU 11 of the shared machine 1 also functions as the subtitle presenter 24, and transmits the conference screen on which the subtitle information is displayed, to the personal computer devices 3, 4, 5, and 7 of the conference participants. Consequently, the conference screen that is displayed on the display of each of the personal computer devices 3, 4, 5, and 7 of the conference participants is updated.

FIG. 7 illustrates a display example of the subtitle information that is displayed on the subtitle generator 41 of the conference screen. In FIG. 7, the speaker is displayed with a human-shaped icon and the name (text data), and the subtitle is displayed in a balloon. The subtitle presenter 24 displays the icons of the speakers, by changing the display modes of the icons, respectively. In other word, the subtitle presenter 24 displays text data of "Mr. A" under the icon of Mr. A, and displays the text data of the first speech of Mr. A of "We will begin today's conference", in the balloon area from the icon.

In addition, as an example, the subtitle presenter 24 displays each of the icons of the speakers in a different display mode in an identifiable manner, such as by displaying the icon of Mr. A in blue, and displaying the icon of Mr. X in yellow. In addition to the above, the icon of each of the speakers may be displayed in a different display mode by using a predetermined image or a symbol.

Second Speech

Next, it is assumed that Mr. A says "Today's agenda is to decide the winner of the patented invention award", as a second speech subsequent to the first speech described above. The speech receiver 21 of the shared machine 1 receives speech data corresponding to the second speech that is collected by the microphone device 2 of Mr. A. The speech recognizer 22 of the shared machine 1 performs a speech recognition process on the received speech data.

In this example, in the speech recognition process, it is assumed that the correct indication of "Today's agenda is to decide the winner of the patented invention award" is recognized incorrectly as "Today's agenda is to D the wine of the patented invention award". In this case, the subtitle generator 23 and the subtitle presenter 24 display the text data of "Today's agenda is to D the wine of the patented invention award" that is recognized incorrectly as illustrated in FIG. 7, on the conference screen of the shared machine 1 and each of the personal computer devices 3, 4, 5, and 7 of the conference participants. A part enclosed by a dotted line square in FIG. 7 is incorrect text data that is generated due to the misrecognition of the speech recognition process.

Third Speech and Fourth Speech

Next, it is assumed that Mr. X says "I would like to recommend Mr. Y's patent in last period", as the third speech. Mr. X then continues, "Because it is installed in product Y", as the fourth speech. In this case also, similar to the above, the speech receiver 21 of the shared machine 1 acquires the third speech and the fourth speech described above that are collected by the microphone device 6 of Mr. X. The speech recognizer 22 to the subtitle presenter 24 of the shared machine 1 display the third speech and the fourth speech of Mr. X on the conference screen in the balloon format, as illustrated in FIG. 7. In addition, the subtitle presenter 24 of the shared machine 1 transmits the subtitle information of the third speech and the fourth speech of Mr. X to the personal computer devices 3, 4, 5, and 7 of the conference participants. The subtitle presenter 24 of each of the personal computer devices 3, 4, 5, and 7 of the conference participants displays the subtitle information of the third speech and the fourth speech of Mr. X that is transmitted from the shared machine 1, on the conference screen in the balloon format as illustrated in FIG. 7. The time axis is formed from the top to the bottom of the conference screen, and the subtitle presenter 24 displays the subtitles of the speech in the order of speech, from the top to the bottom of the conference screen.

Notification of an Unclear Part in the Subtitle

In this example, as described, the subtitle of the second speech of Mr. A is displayed on the conference screen of each of the conference participants, as the incorrect speech recognition result of "Today's agenda is to D the wine of the patented invention award". If the subtitle is left as it is, it is difficult for Ms. B with hearing impairments to understand the content of the conference. In this case, for example, using a mouse pointer, Ms. B indicates the unclear part of the subtitle the content of which is difficult to understand, among the subtitles of the speech of the conference participants that are displayed on the subtitle generator 41 of the conference screen. By functioning as the detector 26, the CPU 11 of the personal computer device 3 of Ms. B detects identification (ID) of an HTML <div> element, corresponding to the speech that is displayed in the unclear part indicated by Ms. B (see FIG. 6).

In other words, in the above example, the speech corresponding to the unclear part indicated by Ms. B is the second speech of Mr. A of "Today's agenda is to D the wine of the patented invention award". The ID of the second speech is <div id="2">. The detector 26 transmits (notifies) the ID of the <div> element of the speech corresponding to the unclear part indicated by Ms. B, to the shared machine 1 and the personal computer devices 3, 4, 5, and 7 of the conference participants.

Figure 8:
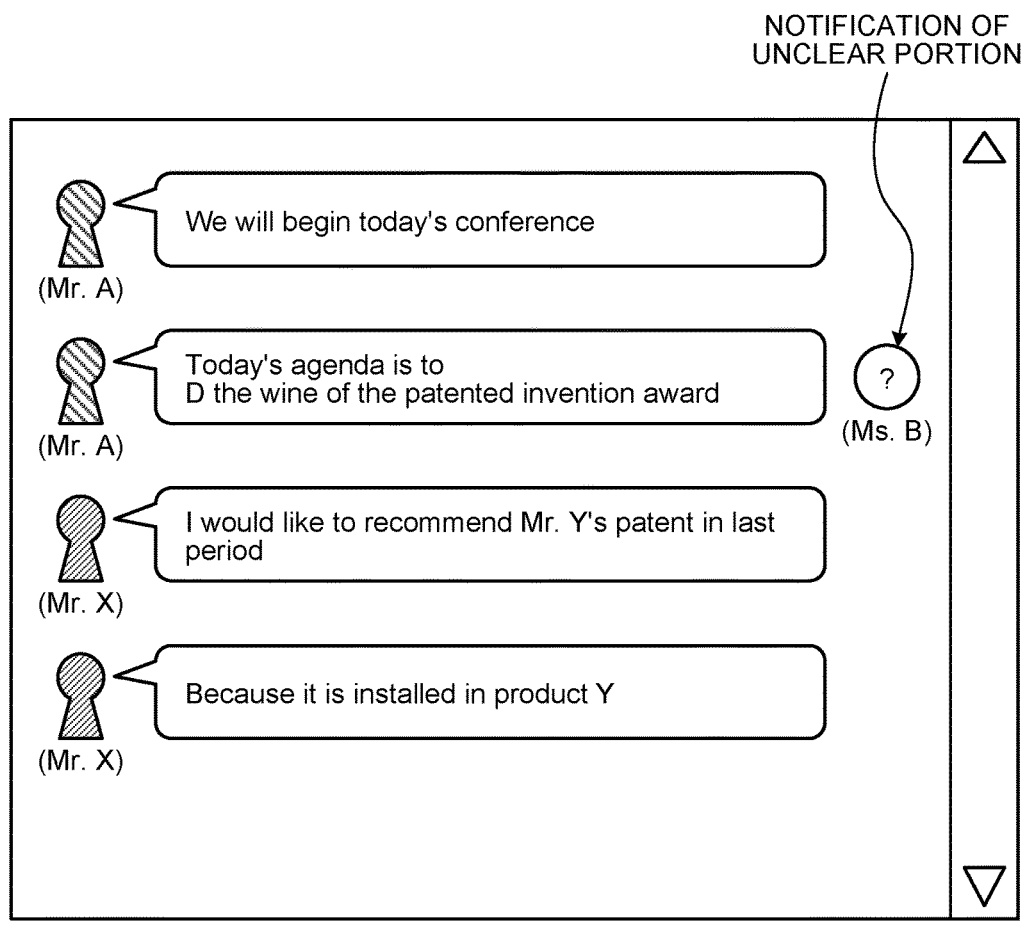
FIG. 8 is a diagram illustrating an unclear icon that is displayed on the conference screen, in the conference support system of the first embodiment.

The subtitle presenter 24 of the shared machine 1 and each of the personal computer devices 3, 4, 5, and 7 of the conference participants that has received the ID of the <div> element of the speech corresponding to the unclear part indicated by Ms. B, displays an unclear icon indicating that the speech is indicated as unclear. The unclear icon is displayed at a position where the conference participants can recognize the subtitle of the speech that is indicated as unclear by Ms. B. FIG. 8 illustrates a conference screen on which the unclear icon is displayed. In the above example, Ms. B has indicated that the second speech of Mr. A of "Today's agenda is to D the wine the patented invention award" as the unclear part. Thus, the subtitle presenter 24 of the shared machine 1 and each of the personal computer devices 3, 4, 5, and 7 of the conference participants displays a question mark icon beside the balloon of the second speech that is assigned with the ID of <div id="2">, and the like. In addition, the subtitle presenter 24 displays the name of an indicator (in this case, Ms. B) who has indicated the unclear part, under the question mark icon. The question mark icon is an example of information illustrating that the subtitle is indicated as incorrect.

At least the unclear icon may be displayed on the balloon in an overlapping manner, or may be displayed at the vicinity of the balloon. The unclear icon may also be an icon other than the question mark icon. In other words, as long as the conference participants can recognize that the speech is indicated as unclear, any form of icon may be displayed at any position.

A Correction Operation of the Unclear Part

Next, Ms. C corrects the unclear part notified by Ms. B. Ms. C specifies with the mouse pointer, for example, the subtitle of the unclear part on the subtitle generator 41 of the conference screen that is displayed on the personal computer device 4 of her own, and enters characters for correction. Upon detecting that Ms. C has started correcting the unclear part indicated by Ms. B, the detector 26 of the personal computer device 4 of Ms. C notifies correction start information to the shared machine 1 and the personal computer devices 3, 5, and 7 of the other conference participants. The correction start information includes information indicating that the correction is started and information indicating the ID of the <div> element of the speech to be corrected and the corrector.

Figure 9:
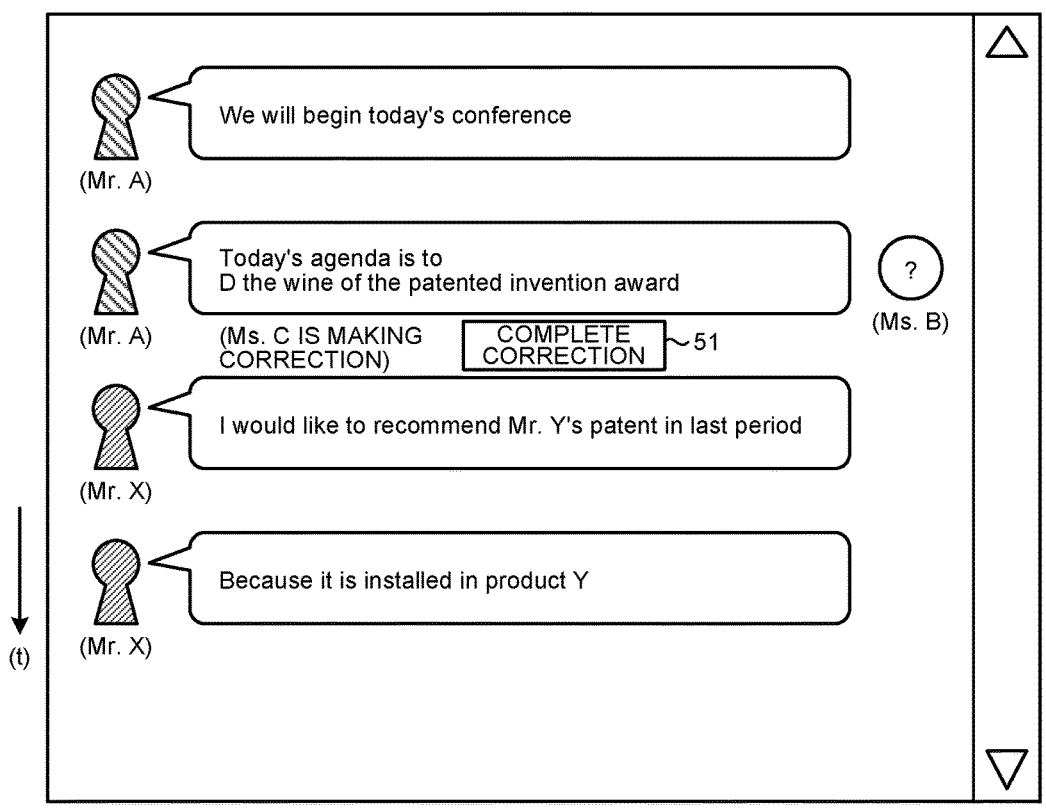
FIG. 9 is a diagram illustrating a display of an indication indicating that a corrector is making a correction, that is to be displayed relative to an unclear part on which the correction is started, in the conference support system of the first embodiment.

Upon receiving the correction start information, the subtitle presenter 24 of the shared machine 1 and each of the personal computer devices 3, 5, and 7 detects the speech to be corrected, based on the ID of the <div> element, and detects the corrector, based on the information indicating the corrector. Then, as illustrated in FIG. 9, the subtitle presenter 24 of the shared machine 1 and each of the personal computer devices 3, 5, and 7 displays an indication indicating that the corrector is making a correction on the unclear part on which the correction is started. FIG. 9 is an example that "Ms. C is making a correction" is displayed under the balloon of the second speech of Mr. A. The character information of "Ms. C is making a correction" is an example of information indicating that the correction is being made.

By viewing the display, the conference participants can recognize that Ms. C is making a correction on the unclear part that is indicated by Ms. B. In this example, "Ms. C is making a correction" is displayed under the balloon of the second speech of Mr. A. However, "Ms. C is making a correction" may be displayed in the balloon of the second speech. In addition, as long as the corrector and the part to be corrected can be recognized, the above may be displayed at any position.

When correct characters and the like are entered as a result of the correction operation by Ms. C, the CPU 11 of the personal computer device 4 of Ms. C displays the input information of the input characters and the like on the display 17 of the personal computer device 4 of Ms. C. Consequently, the subtitle to be corrected is updated to the correct characters and the like, on the personal computer device 4 of Ms. C. In addition, when the correct characters and the like are entered as a result of the correction operation by Ms. C, the CPU 11 of the personal computer device 4 of Ms. C transmits the input information such as the input characters, to the shared machine 1 of Mr. A who is the facilitator. The CPU 11 of the shared machine 1 of Mr. A displays the received input information on the display 17 of the personal computer device 4 of Mr. A. The CPU 11 of the shared machine 1 of Mr. A also transmits the received input information to the personal computer device 4 of Ms. B, Mr. X and Mr. Y. Consequently, it is possible to display the input information that is entered by the correction operation of Ms. C on the personal computer devices of all the conference participants, in substantially real time.

In this example, the input information by the correction operation is temporarily transmitted to the shared machine 1 of Mr. A who is the facilitator, and the information is transmitted from the shared machine 1 to the personal computer devices of the other conference participants. However, the CPU 11 of the personal computer device of Ms. C who is performing the correction operation may directly transmit the input information obtained by the correction operation, to the personal computer devices of the other conference participants.

Fifth Speech

Next, it is assumed that Mr. Y says "I would like to recommend Mr. Z's patent". The speech receiver 21 of the shared machine 1 of Mr. A who is the facilitator acquires speech data of the fifth speech of "I would like to recommend Mr. Z's patent" that is collected by the microphone device 8 of Mr. Y. Next, the speech recognizer 22 of the shared machine 1 performs a speech recognition process based on the speech data of the acquired fifth speech, and generates text data corresponding to the speech recognition result of "I would like to recommend Mr. Z's patent".

Operation of Generating a Summary

In this example, in the conference support system of the first embodiment, while the detector 26 is detecting the correction operation by the corrector, the shared machine 1 of Mr. A who is the facilitator shifts from a "normal mode" to a "summary mode". Then, the summary generator 25 generates text data in which the speech recognition result of the speech subsequent to the speech that is currently being corrected, is summarized.

Summary Operation of Each Speech of the Conference Participants

Figure 10:
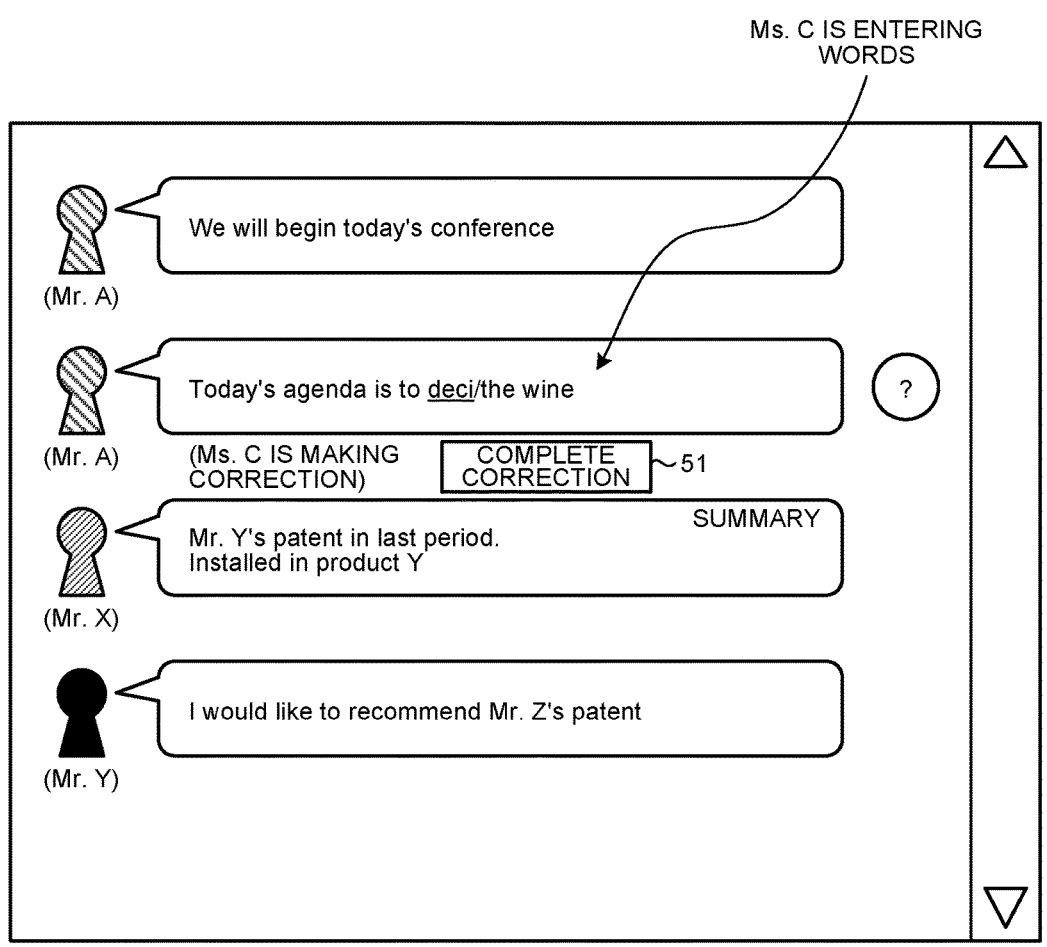
FIG. 10 is a diagram illustrating subtitles of speech of other conference participants that are present subsequent to the subtitle being currently corrected, in the conference support system of the first embodiment.

More specifically, upon shifting to the "summary mode", as illustrated in FIG. 10, the summary generator 25 of the shared machine 1 of Mr. A determines whether there is a subtitle of speech of any of the conference participants, subsequent to the subtitle of the second speech of Mr. A that is currently being corrected by Ms. C. If there is the subtitle, the summary generator 25 specifies the conference participant who said the subtitle. Information on the conference participant who said the subtitle, information on the time of the speech, and the like are assigned to the subtitle (text data) corresponding to each speech. Consequently, the summary generator 25 specifies the conference participant who said the subtitle, by referring to the information on the conference participant that is assigned to the subtitle of the speech.

The summary generator 25 then performs a summary process on the text data that is generated by the speech recognizer 22 and that corresponds to the speech of the conference participant. The summary generator 25 summarizes the text data so that the text data is within the displayable number of words (or characters) per single subtitle, for example, into a subtitle of 10 to 15 words. For example, the summary generator 25 removes auxiliary verbs etc. from the text data that is the recognition result of a single block of speech data, i.e., an utterance unit. In addition, by extracting keywords and the like, the summary generator 25 generates text data that is summarized into 10 to 15 words.

The "summary process" is a concept including a process of removing auxiliary verbs and the like from a sentence; a process of reducing the overall number of words (characters) in the sentence, by displaying keywords extracted from the text data of speech; a process of reducing the overall number of words (characters) in the sentence, by replacing a word with a predetermined number of words (characters) to another word with equal to or less than the predetermined number of words (characters), and the like.

When the text data in which the number of words (characters) is equal to or more than the displayable number of words (characters) per single subtitle is generated by the summary process as described above, the summary generator 25 may generate summarized text data, by removing the words (characters) that are equal to or more than the displayable number of words (characters). In this case, for example, if the displayable number of words is 15 words, the summary generator 25 may generate a summary the total number of words of which is within the displayable number of words, by leaving the first word to the 15th word, and discarding the 16th word and the subsequent words.

When the speech of the same participant continues, the summary generator 25 generates a summary within the displayable number of words (characters) per single subtitle, by combining the pieces of speech by the same participant. For example, as illustrated in FIG. 8, it is assumed that Mr. X says "I would like to recommend Mr. Y's patent in last period", followed by "Because it is installed in product Y", subsequent to the second speech of Mr. A that is currently being corrected by Ms. C. In this case, for example, the summary generator 25 generates a single summary in which the speech recognition results of the two pieces of speech of Mr. X are summarized into "Mr. Y's patent in last period. Installed in product Y", as illustrated in FIG. 10.

When the speech of the same conference participant continues, the summary generator 25 may generate a summary corresponding to the "first speech" or the "first speech and a predetermined number of speech subsequent to the first speech" among the speech of the same conference participant.

The subtitle generator 23 generates subtitle information from the summarized text data that is generated by the summary generator 25. In addition, the subtitle generator 23 adds a word "summary" indicating that the subtitle information is the summary, on the subtitle information. The subtitle presenter 24 displays the subtitle information of the generated summary and the word "summary" on the display 17. Consequently, as illustrated in FIG. 10, for example, the summarized subtitle of "Mr. Y's patent in last period. Installed in the product Y", and the word "summary" indicating that the subtitle is the summary, are displayed on the display 17.

Operation on the Completion of Correction

Next, when the detector 26 of the personal computer device 4 of Ms. C detects that the correction operation has stated, as illustrated in FIG. 9 and FIG. 10, the subtitle generator 23 and the subtitle presenter 24 of the personal computer device 4 of Ms. C display a correction completion button 51 beside the display of "Ms. C is making a correction" indicating that the correction is being made, or the like. The correction completion button 51 is operated when the correction operation has completed. In this example, the CPU 11 of the personal computer device 4 of Ms. C who is performing the correction operation displays the correction completion button 51 on the display 17 of the personal computer device 4 of Ms. C. However, the correction completion button 51 may be displayed on each of the personal computer devices 1, 3, 5, and 7 of the other conference participants, when the CPU 11 of the personal computer device 4 of Ms. C who is performing the correction operation communicates with the personal computer devices 1, 3, 5, and 7 of the other conference participants.

When Ms. C completes the correction operation of correcting the subtitle of the speech recognition result that is incorrectly recognized as "Today's agenda is to D the wine of the patented invention award", to the correct subtitle of "Today's agenda is to decide the winner of the patented invention award", Ms. C operates the correction completion button 51 that is displayed on the display 17. Upon detecting that the correction completion button 51 is operated, the detector 26 of the personal computer device 4 of Ms. C transmits correction completion information to the shared machine 1 of Mr. A who is the facilitator. Upon receiving the correction completion information, the shared machine 1 of Mr. A shifts from the "summary mode" to the "normal mode, and the summary generator 25 finishes generating the summary as described above. The shared machine 1 is then operated in the "normal mode". The subtitle generator 23 and the subtitle presenter 24 generate a subtitle corresponding to each speech recognition result of the speech of each of the conference participants, which is supplied from the speech recognizer 22 as described above, and display the subtitle on the display 17.

Figure 11:
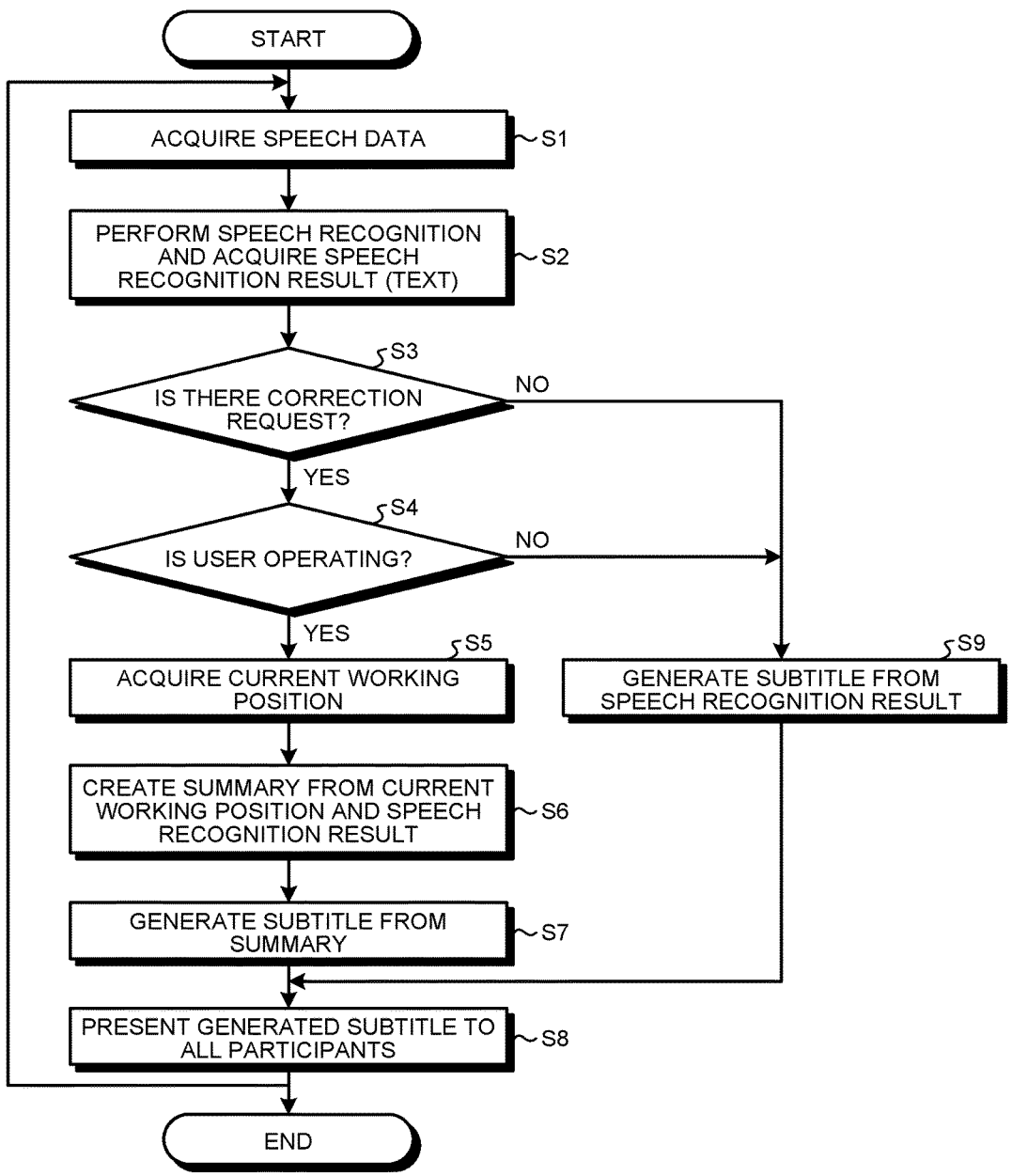
FIG. 11 is a flowchart illustrating a flow of a summary generation operation, in the conference support system of the first embodiment.

The flowchart in FIG. 11 illustrates a flow of a summary generation operation by the CPU 11 of the shared machine 1 of Mr. A, in the conference support system of the first embodiment described above. In the flowchart of FIG. 11, at step S1, the CPU 11 of the shared machine 1 functions as the speech receiver 21, and receives speech data of speech that is acquired by the microphone device of the conference participant who uttered the speech. At step S2, the speech recognizer 22 performs the speech recognition process based on the acquired speech data, and generates text data that is the speech recognition result.

At step S3, for example, it is determined whether Ms. B with hearing impairments has indicated an unclear part of the subtitle or the like (presence of a correction request). If there is no correction request (No at step S3: normal mode), at step S9, the subtitle generator 23 and the subtitle presenter 24 generate a subtitle corresponding to the speech recognition result. At step S8, the subtitle generator 23 and the subtitle presenter 24 of the personal computer of Mr. A display the generated subtitle on the display 17 of each of the personal computer devices 3, 4, 5, and 7 of the other conference participants, and the process of the flowchart in FIG. 11 finishes.

On the other hand, if the correction request is detected (Yes at step S3), the process proceeds to step S4. At step S4, the summary generator 25 of the shared machine 1 of Mr. A determines whether a person in charge of correction is currently making a correction, from when the correction start information is notified from the personal computer device 4 of Ms. C to when the correction completion information is notified (whether the shared machine 1 is in the summary mode). If it is determined that the person in charge of correction is not currently making a correction (determined that the shared machine 1 is currently in the normal mode: No at step S4), the process proceeds to step S9. Consequently, the subtitle generator 23 and the subtitle presenter 24 of the personal computer of Mr. A display the generated subtitle on the display 17 of each of the personal computer devices 3, 4, 5, and 7 of the other conference participants, and the process of the flowchart in FIG. 11 finishes.

At step S4, if it is determined that the person in charge of correction is currently making a correction (determined that the shared machine 1 is currently in the summary mode: Yes at step S4), the process proceeds to step S5. At step S5, the summary generator 25 of the shared machine 1 of Mr. A detects the current working position, by acquiring the ID of the <div> element of the subtitle that is currently being corrected. At step S6, the summary generator 25 of the shared machine 1 of Mr. A generates a summary corresponding to the speech subsequent to the current working position.

At step S7 and step S8, the subtitle generator 23 and the subtitle presenter 24 of the shared machine 1 of Mr. A display the subtitle of the generated summary on the display 17 of each of the personal computer devices 3, 4, 5, and 7 of the other conference participants, and the process of the flowchart in FIG. 11 finishes. Consequently, while the indicated part is being corrected, the summary of each speech can be displayed, and the person in charge of correction or the like can easily understand the content of the conference that has made progress while the person in charge of correction is making a correction or the like.

As is evident from the above description, the conference support system of the first embodiment performs the speech recognition process on the speech of each of the conference participants, generates a subtitle corresponding to the speech recognition result, and displays the subtitle on the display 17 of the personal computer device of each of the conference participants.

Due to the misrecognition of the speech recognition process and the like, for example, when Ms. B who has hearing impairments requests to correct a subtitle that is difficult to understand, Ms. C who is in charge of correction makes a correction on the subtitle. While Ms. C is making a correction, the system shifts from the "normal mode" to the "summary mode". During the "summary mode", the system generates and displays summarized subtitle of the speech subsequent to the subtitle that is being corrected. Consequently, while Ms. C is making a correction (during the summary mode), the summary of the speech of the conference participants is displayed.

Thus, while the person in charge of correction or the person with hearing impairments who are attending the conference, is correcting the incorrect subtitle or confirming the corrected result, respectively, the person in charge of correction and the person with hearing impairments can understand the outline of the discussion that is currently in progress. Hence, the person in charge of correction and the person with hearing impairments can smoothly participate (return to) the discussion that is currently being held, after the completion of the correction operation.

Second Embodiment

Next, a conference support system of a second embodiment will be described.

Summary Operation Per Topic

In the first embodiment described above, the summary generator 25 has generated the summary for each speech of the conference participants. In the second embodiment, the summary generator 25 extracts a predetermined sentence such as a topic from the proceedings of the past conferences, and generates the summary per topic. The second embodiment is different from the first embodiment described above only in this point. Thus, only the difference between the first embodiment and the second embodiment will be described, and the repeated description will be omitted.

That is, in the conference support system of the second embodiment, the summary generator 25 of the shared machine 1 of Mr. A who is the facilitator extracts in advance the information (topic information) indicating the topics of the conferences, from the proceedings (conference information) of the past conferences that are stored in the HDD 14. The summary generator 25 then stores the information in the HDD 14. The topic information is an example of sentence information, and the HDD 14 is an example of a sentence information storage.

Upon shifting to the summary mode, the summary generator 25 compares the text data of the speech of each of the conference participants with the text data of the topic in the past conferences that are extracted in advance. Then, if there is any speech that matches with or sounds close to the topic in the past conferences, the summary generator 25 summarizes the subtitle of the speech of the conference participant that matches with or sounds close to the topic in the past conferences, into the words of the topic that are stored in the HDD 14. The summary generator 25 then displays the summarized subtitle.

Figure 12:
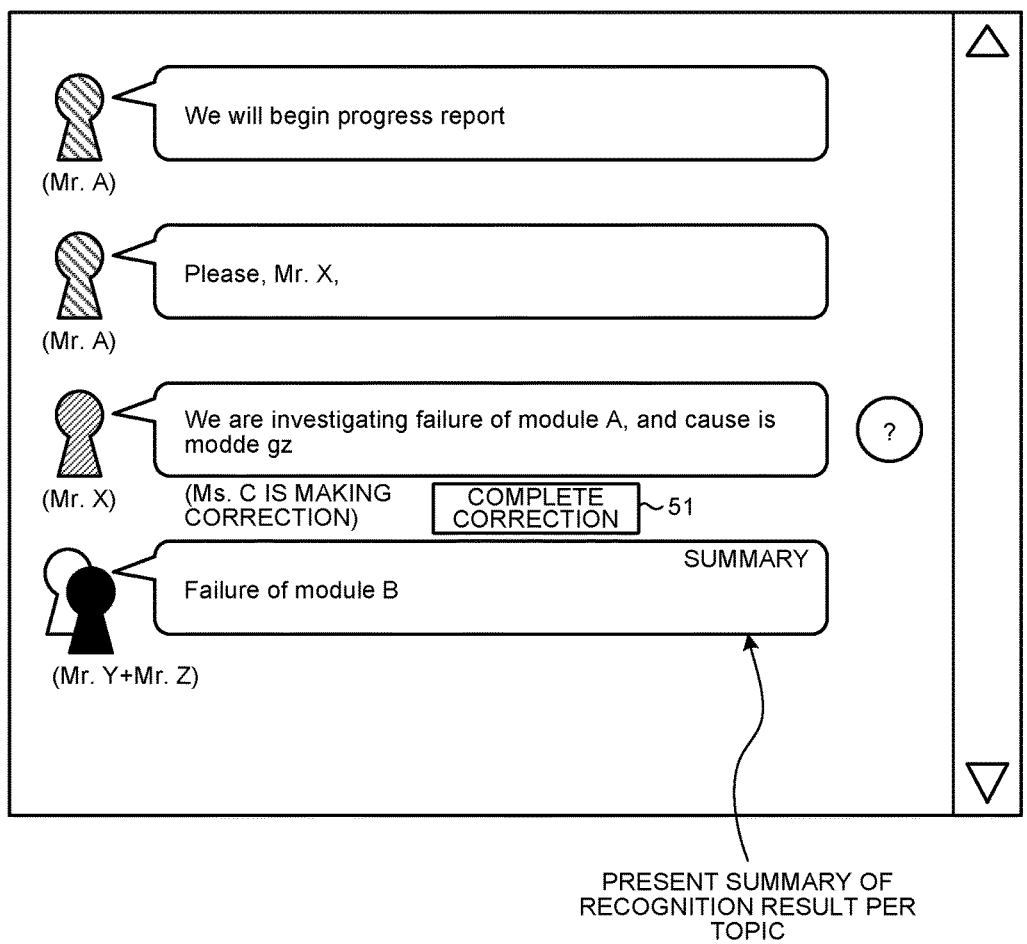
FIG. 12 is a diagram of an example in which a topic extracted from the proceedings of the past conferences is displayed as a summary of the speech of the conference participants, in a conference support system of a second embodiment.

FIG. 12 is a display example of the conference support system of the second embodiment. In FIG. 12, a past topic of a "failure of the B module" is extracted from the proceedings of the past conferences. In this example, because Mr. Y and Mr. Z who are the conference participants have said, "There is a failure in the B module", for example, the summary generator 25 determines that the speech of Mr. Y and Mr. Z matches with the past topic of the "failure of the B module". In this case, the summary generator 25 displays information in which a part of the icons of Mr. Y and Mr. Z are overlapped with each other. The summary generator 25 also summarizes the speech of Mr. Y and Mr. Z to the topic of the past conference of the "failure of the B module".

In this manner, the conference support system of the second embodiment can obtain the same effects as those of the first embodiment described above, in which the person in charge of correction or the person with hearing impairments who are attending the conference can understand the outline of the discussion that is in progress, while the person in charge of correction or the person with hearing impairments is making a correction on the incorrect subtitle or confirming the correction result; and can smoothly participate (return to) the discussion that is currently being held, after the completion of the correction operation, and the like.

Third Embodiment

Next, a conference support system of a third embodiment will be described. In the conference support system of the third embodiment, keywords are extracted in advance from the agenda of the conference, and the keywords are weighted. Then, the number of characters of the summary to be created is changed according to a weighting coefficient of each of the keywords that is included in the speech. The third embodiment is different from the second embodiment described above only in this point. Thus, only the difference between the second embodiment and the third embodiment will be described, and the repeated description will be omitted.

In other words, in the conference support system of the third embodiment, the summary generator 25 of the shared machine 1 of Mr. A who is the facilitator is stored in the HDD 14. The summary generator 25 extracts in advance keywords from the agenda of the conference to be held, adds the weighting coefficient to each of the keywords, and stores the keywords in a storage such as the HDD 14. The HDD 14 is an example of a keyword storage.

Upon shifting to the summary mode, the summary generator 25 detects the keywords included in the text data of the speech of each of the conference participants, and detects the weighting coefficient of the detected keyword, from the HDD 14. The summary generator 25 then generates a sentence-style summary such as the "failure of the B module", for the speech that includes the keyword with a weighting coefficient having a high value. The summary generator 25 generates a word-style summary such as a "B module", for the speech that only includes the keyword with a weighting coefficient having a low value.

Thus, the speech that includes important keywords may be summarized into a longer sentence, and the speech that only includes less important keyword may be summarized into a shorter sentence.

In addition, the summary generator 25 may adjust the length of the summarized sentence, according to the length of time the conference participant has spoken or the number of times the conference participant has spoken. For example, if the conference participant has spoken for three minutes, the summary generator 25 generates a summary of three sentences. In addition, if the conference participant has spoken three times, the summary generator 25 displays three keywords. If the conference participant has spoken for a long time, or if the conference participant has spoken many times, the speech is most likely important. Thus, it is possible to generate a summary with the length of sentence according to the importance of speech, by generating the summary in which the length of sentence is adjusted according to the length of time or the number of times the conference participant has spoken.

Fourth Embodiment

Next, a conference support system of a fourth embodiment will be described. In the conference support system of the fourth embodiment, if the number of characters of the summary to be created is equal to or more than the displayable number of characters per subtitle, the font size is adjusted so that the created summary can be displayed on a displayable area of the single subtitle. The fourth embodiment is different from the embodiments described above only in this point. Thus, only the difference between the embodiments described above and the fourth embodiment will be described, and the repeated description will be omitted.

Figure 13:
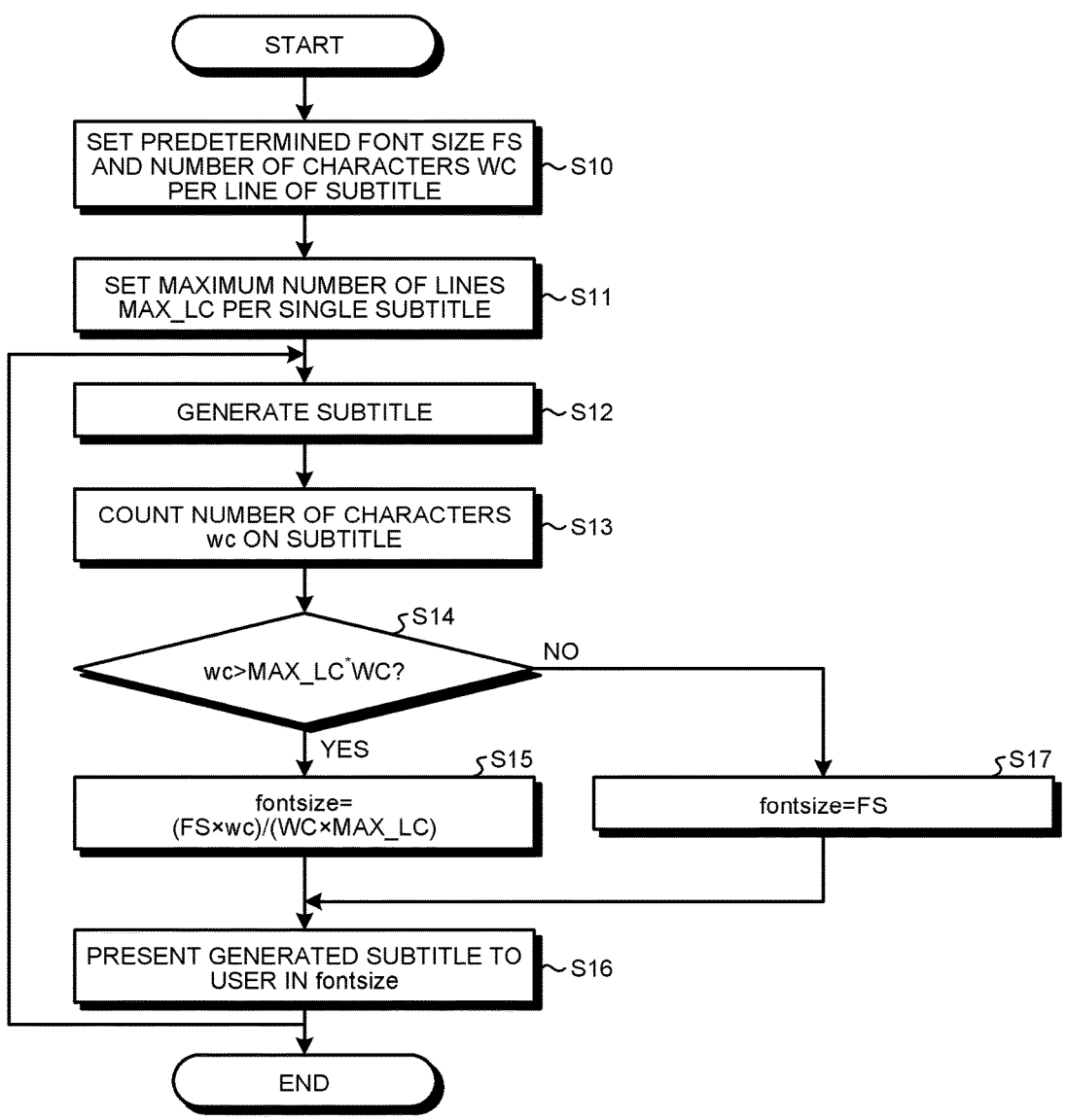
FIG. 13 is a flowchart illustrating a flow of an adjustment operation of a font size of a summary, in a conference support system of a fourth embodiment.

FIG. 13 is a flowchart illustrating a flow of an adjustment operation of a font size of the shared machine 1 of Mr. A who is the facilitator, in the conference support system of the fourth embodiment. At step S10, the CPU 11 of the shared machine 1 of Mr. A stores a value of a predetermined font size FS that is set by Mr. A or the like, and a value of the number of words (characters) WC per line of a single subtitle, in the storage such as the HDD 14 or the RAM 13. At step S11, the CPU 11 of the shared machine 1 of Mr. A stores a value of a maximum number of lines MAX_LC per single subtitle that is set by Mr. A or the like, in the storage such as the HDD 14 or the RAM 13.

At step S12, by shifting to the summary mode, the summary generator 25 of the shared machine 1 of Mr. A generates a summarized subtitle. At step S13, the summary generator 25 counts the number of words (characters) wc in the generated summarized subtitle. At step S14, the summary generator 25 determines whether a value obtained by multiplying the number of words (characters) WC per line of the subtitle by the maximum number of lines MAX_LC per single subtitle is less than the number of words (characters) wc in the counted summarized subtitle (wc>MAX_LC× WC).

When the value obtained by multiplying the number of words (characters) WC per line of the subtitle by the maximum number of lines MAX_LC per single subtitle, is less than the number of words (characters) wc in the counted summarized subtitle, it means that the generated summarized subtitle can be displayed on the display area of the single subtitle, without changing the font size. Thus, at step S17, the summary generator 25 sets the font size of the generated summary to the predetermined font size FS that is set at step S10. In this case, at step S16, the subtitle generator 23 and the subtitle presenter 24 display the generated summary on the display area of the single subtitle, in the predetermined font size.

On the other hand, when the value obtained by multiplying the number of words (characters) WC per line of the subtitle by the maximum number of lines MAX_LC per single subtitle, is equal to or more than the number of words (characters) wc in the counted summarized subtitle, it means that the generated summarized subtitle cannot be displayed on the display area of the single subtitle. Thus, the summary generator 25 proceeds the process to step S15, and sets a value obtained by dividing the value that is obtained by multiplying the number of words (characters) wc in the counted summarized subtitle by the predetermined font size FS, by the value that is obtained by multiplying the number of words (characters) WC per line of the subtitle by the maximum number of lines MAX_LC per single subtitle, as the font size for the generated summary (fontsize=(FS×wc)/ (WC×MAX_LC)). In this case, at step S16, the subtitle generator 23 and the subtitle presenter 24 display the generated summary on the display area of the subtitle, in the font size that is calculated by the formula of "fontsize=(FS×wc)/ (WC×MAX_LC)". Consequently, all the words (characters) in the generated summary can be displayed on the display area of the single subtitle.

Figure 14:
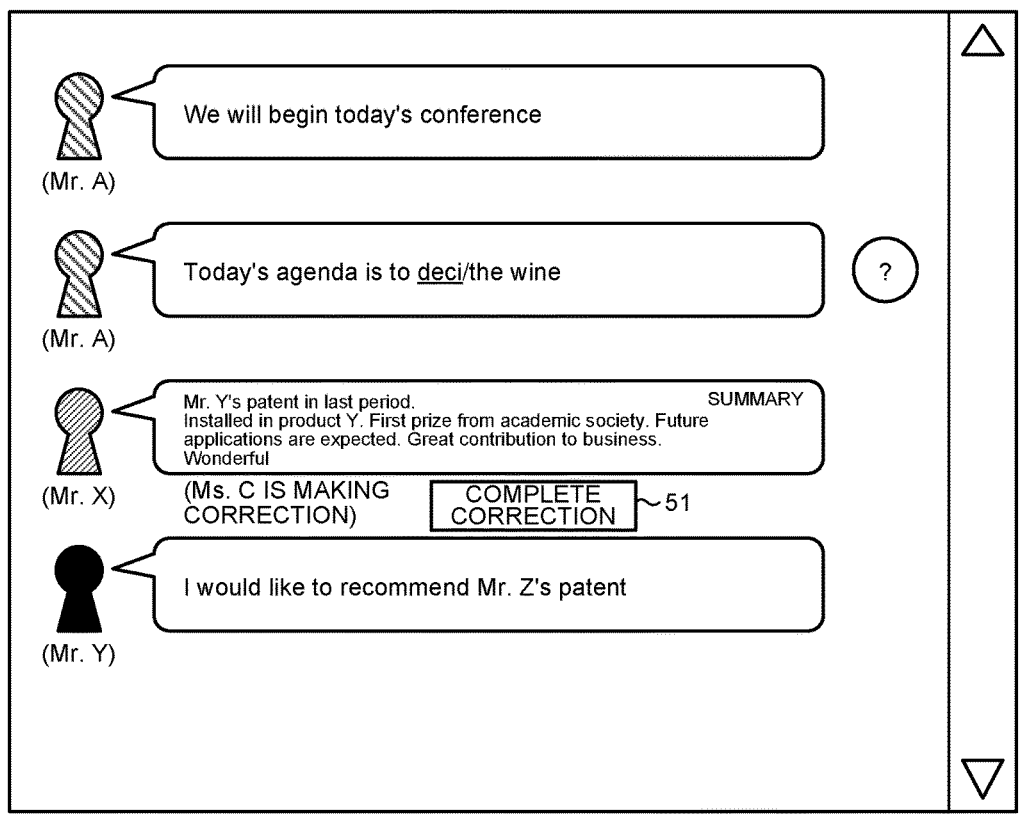
FIG. 14 is a diagram illustrating an example of the summary that is displayed by adjusting the font size, in the conference support system of the fourth embodiment.

In this manner, the conference support system of the fourth embodiment sets the predetermined font size, the number of words (characters) to be displayed per line of the subtitle, and the maximum number of lines relative to the display area of the single subtitle. Then, if the number of lines of the text data that is the speech recognition result, or the number of lines of the text data of the generated summary is equal to or less than the maximum number of lines, the conference support system of the fourth embodiment displays the generated summary in the predetermined font size. On the other hand, if the number of lines of the text data that is the speech recognition result, or the number of lines of the text data of the summary is equal to or more than the maximum number of lines, the conference support system of the fourth embodiment adjusts the font size of the generated summary so that the generated summary fits into the maximum number of lines. The generated summary is then displayed. Consequently, for example, as illustrated in FIG. 14, even if the summary is long as "Mr. Y's patent in last period. Installed in product Y. First prize from academic society. Future applications are expected. Great contribution to business. Wonderful", all the characters in the summary can be displayed on the display area of the single subtitle, by adjusting the font size to a smaller font size than the predetermined font size. In addition, it is possible to obtain the same effects as those in the above embodiments. In the example in FIG. 14, the predetermined font size on the display area of the single subtitle is "12", the number of characters per line of the subtitle is "10 words", and the maximum number of lines is "4 lines".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A conference support apparatus comprising:
    a recognizer implemented in computer hardware and configured to recognize speech in speech data and generate text data;
    a detector implemented in computer hardware and configured to detect a correction operation performed on a first portion of the text data, the correction operation being an operation of correcting character data that has been incorrectly converted;
    a summarizer implemented in computer hardware, the summarizer, when performance of the correction operation is detected, configured to generate a summary relating to at least a second portion of the text data that is subsequent to the first portion of the text data; and
    a subtitle generator implemented in computer hardware and configured to:
        generate subtitle information corresponding to the summary when performance of the correction operation is detected, and
        generate subtitle information corresponding to the text data when performance of the correction operation is not detected,
    wherein the summarizer adjusts a font size of a character in the summary so that the summary being created is displayable on a display area for a single subtitle in a display.

2. The apparatus according to claim 1, wherein
    the detector is further configured to detect a presence of an indicator that indicates a portion of the subtitle information is incorrect, and
    the subtitle generator is further configured to:
        add an error indicator, relative to the portion of the subtitle information that is incorrect, that indicates that the portion of the subtitle information is incorrect; and
        display the error indicator.

3. The apparatus according to claim 1, wherein the subtitle generator is further configured to:
    add a correction indicator, relative to a portion of the subtitle information that is being corrected, to the portion of the subtitle information being corrected; and
    display the correction indicator when performance of the correction operation is detected.

4. The apparatus according to claim 1, wherein the summarizer generates the summary for each portion of the text data corresponding to an utterance unit.

5. The apparatus according to claim 1, further comprising:
    a sentence information storage configured to store sentence information, wherein
    the summarizer generates the sentence information that matches to a threshold degree with at least the second portion of the text data that is subsequent to the first portion of the text data as the summary.

6. The apparatus according to claim 1, further comprising:
    a keyword storage configured to store one or more keywords, wherein the one or more keywords are associated with one or more weighting coefficients, wherein at least one of the one or more keywords is associated with a different weighting coefficient than at least one other of the one or more keywords, and wherein
    the summarizer is further configured to:
        determine a weighting coefficient corresponding to a keyword that is included in at least the second portion of the text data that is subsequent to the first portion of the text data; and
        generate the summary based at least in part on the weighting coefficient, wherein a number of characters within the summary is changed based at least in part on the weighting coefficient.

7. The apparatus according to claim 1, wherein the summarizer, when generating the summary, adjusts, based at least in part on a frequency that text data of a person appears among a portion of text data corresponding to an utterance unit, a length of time the text data corresponding to the utterance unit is displayed, or a length of a sentence within the summary.

8. The apparatus according to claim 1, wherein the subtitle generator displays the generated subtitle information on the display.

9. A conference support method comprising:
    recognizing speech in speech data and generating text data;
    detecting a correction operation performed on a first portion of the text data, the correction operation being an operation of correcting character data that has been incorrectly converted;
    generating a summary relating to at least a second portion of the text data that is subsequent to the first portion of the text data, when performance of the correction operation is detected; and
    generating:
        subtitle information corresponding to the summary when performance of the correction operation is detected, and
        subtitle information corresponding to the text data when performance of the correction operation is not detected,
    wherein the generating a summary includes adjusting a font size of a character in the summary so that the summary being created is displayable on a display area for a single subtitle in a display.

10. A computer program product comprising a non-transitory computer-readable medium containing a program, wherein the program, when executed by a computer, causes the computer to execute:
    recognizing speech in speech data and generating text data;
    detecting a correction operation performed on a first portion of the text data, the correction operation being an operation of correcting character data that has been incorrectly converted;
    generating a summary relating to at least a second portion of the text data that is subsequent to the first portion of the text data, when performance of the correction operation is detected; and
    generating:

subtitle information corresponding to the summary when performance of the correction operation is detected, and subtitle information corresponding to the text data when performance of the correction operation is not detected, wherein the generating a summary includes adjusting a font size of a character in the summary so that the summary being created is displayable on a display area for a single subtitle in a display.

* * * * *